(12) United States Patent
Kuraseko et al.

(10) Patent No.: US 8,658,257 B2
(45) Date of Patent: Feb. 25, 2014

(54) METHOD OF MANUFACTURING OPTICAL FIBER

(75) Inventors: Hiroshi Kuraseko, Tokyo (JP); Nobuaki Orita, Tokyo (JP); Yasuo Nakajima, Tokyo (JP); Minoru Kasahara, Tokyo (JP); Keisuke Ui, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 81 days.

(21) Appl. No.: 13/008,518

(22) Filed: Jan. 18, 2011

(65) Prior Publication Data

US 2011/0177257 A1 Jul. 21, 2011

(30) Foreign Application Priority Data

Jan. 19, 2010 (JP) ................................ 2010-009291
Jan. 6, 2011 (JP) ................................ 2011-001390

(51) Int. Cl.
*C08J 7/04* (2006.01)
(52) U.S. Cl.
USPC .................... 427/513; 427/163.2; 427/508
(58) Field of Classification Search
USPC ...................................... 427/508, 163.2, 513
See application file for complete search history.

(56) References Cited

U.S. PATENT DOCUMENTS

| 5,942,020 | A | 8/1999 | Marcelissen |
| 6,309,712 | B1 | 10/2001 | Schuepbach et al. |
| 6,325,981 | B1 | 12/2001 | Schuepbach et al. |
| 6,530,243 | B1 * | 3/2003 | Kuwahara et al. ............... 65/377 |
| 2007/0286950 | A1 * | 12/2007 | Kwon et al. ............... 427/163.2 |

FOREIGN PATENT DOCUMENTS

| EP | 1 088 638 A2 | 4/2001 |
| EP | 1 088 638 A3 | 4/2001 |
| JP | 6-211545 | 8/1994 |
| JP | 10-338552 | 12/1998 |
| JP | 2005-162523 | 6/2005 |
| JP | 2005-224689 | 8/2005 |

OTHER PUBLICATIONS

Machine Translation of JP2005-224689.*
Machine translation of JP 06-211545.*
The Extended European Search Report issued May 2, 2011, in Application No. / Patent No. 11151227.3-2111.
U.S. Appl. No. 13/735,514, filed Jan. 7, 2012, Ui.

* cited by examiner

*Primary Examiner* — Robert S Walters, Jr.
(74) *Attorney, Agent, or Firm* — Oblon, Spivak, McClelland, Maier & Neustadt, L.L.P.

(57) ABSTRACT

A method of manufacturing an optical fiber, comprises applying a UV cured resin to an outer circumference of a running glass optical fiber, forming an accompanying flow composed of an inert gas near a surface of the resin by passing the glass optical fiber immediately after having the resin being applied through an atmosphere of the inert gas, and forming a coating by irradiating the resin coated with the accompanying flow with ultraviolet ray to cure the resin while the glass optical fiber accompanied by the accompanying flow is passed through a UV transmission tube to which a gas containing oxygen is supplied.

10 Claims, 5 Drawing Sheets

METHOD OF MANUFACTURING OPTICAL FIBER

CROSS-REFERENCE TO RELATED APPLICATIONS

This application is based upon and claims the benefit of priority from the prior Japanese Patent Applications No. 2010-009291, filed on Jan. 19, 2010 and Japanese Patent Applications No. 2011-001390, filed on Jan. 6, 2011; the entire contents of which are incorporated herein by reference.

BACKGROUND OF THE INVENTION

1. Field of the Invention

The present invention relates to a method of manufacturing an optical fiber in which a coating is formed on a glass optical fiber.

2. Description of the Related Art

An optical fiber is manufactured in a way described below. Firstly, a glass preform is heated in a furnace and melted at one end of the glass preform. Then the glass preform is drawn at the heated end to be formed into a glass optical fiber. Next, a resin is coated of the drawn glass fiber. Accordingly, the optical fiber is manufactured.

The coating of an optical fiber is generally formed in a way described below. Firstly, in order to have a resin applied on the glass optical fiber, the glass optical fiber is passed through a resin-coating die filled with a UV cured resin (hereinafter to be referred to as a resin when appropriate). Next, the glass optical fiber with the UV cured resin being applied is passed through a coating apparatus.

The coating apparatus is composed of a transparent tube and an ultraviolet source arranged in the periphery outer of the transparent tube. For example, a transparent tube is made of quartz glass. While passing through the transparent tube of the coating apparatus, a coated resin is cured by being irradiated with ultraviolet ray supplied from the UV source through the transparent tube of the coating apparatus, whereby the coating of optical fiber is formed.

In general, when a UV resin is cured in ambient air, that is in high oxygen concentrations atmosphere, the resin reacts with oxygen to cause insufficient curing, which leads to formation of a low-quality coating. As a solution to prevent this problem, a technology of irradiating a resin with UV in the presence of inert gas is disclosed (in Japanese Patent Application Laid-open No. 6-211545, for example).

Meanwhile, in the process of curing the resin, a portion of the resin is volatilized by the reaction heat generated in curing the resin and the heat generation caused by the absorption of light energy of the emitted light, and adheres to the inner surface of the transparent tube. Resin component adhering to the inner surface of the transparent tube will be altered by the UV irradiation to cause fogging in the transparent tube. The fogging reduces the amount of ultraviolet ray reaching the resin and causes insufficient curing, which also leads to formation of a low-quality coating.

As a solution of this problem, Japanese Patent Application Laid-open No. 2005-224689 discloses a technology of obtaining sufficient curing of the UV resin by supplying an inert gas to a running region of the glass optical fiber in the transparent tube while also supplying a gas partially containing oxygen to the periphery of the above-mentioned running region to form a two-laminar flow with the inert gas and the oxygen-contained gas on the surface of the transparent tube. With such two-laminar flow, fogging inside the transparent tube can be lessen.

SUMMARY OF THE INVENTION

According to an aspect of the present invention, there is provided a method of manufacturing an optical fiber, comprises applying a UV cured resin to an outer circumference of a running glass optical fiber, forming an accompanying flow composed of an inert gas near a surface of the resin by passing the glass optical fiber immediately after having the resin being applied through an atmosphere of the inert gas, and forming a coating by irradiating the resin coated with the accompanying flow with ultraviolet ray to cure the resin while the glass optical fiber accompanied by the accompanying flow is passed through a UV transmission tube to which a gas containing oxygen is supplied.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Insufficient curing of resin can be sometimes detected even if the method disclosed by Japanese Patent Application Laid-open No. 2005-224689 is used. The inventors of the present invention have found that such behavior is due to formation of an accompanying flow composed mainly of ambient air containing oxygen at the surface of the coated resin on the glass optical fiber, such formation of the accompanying flow taking place between the coating die and the coating apparatus.

When such accompanying flow of ambient air is formed, the glass optical fiber will be surrounded by the accompanying flow even after the glass optical fiber enters the transparent tube of the coating apparatus. When an inert gas is supplied to such glass optical fiber surrounded by the accompanying flow of ambient air, the glass optical fiber remains coated with the accompanying flow that contains oxygen. Therefore, it is difficult to produce an inert gas atmosphere in the vicinity of the resin surface. As a result, the resin will react with the oxygen in the accompanying flow, whereby curing of resin will become insufficient.

In order to strip off the accompanying flow from the surface of the glass optical fiber by blowing an inert gas onto the glass optical fiber, a large amount of inert gas is needed, which results in shaking or breaking of the running optical fiber.

In order to solve the above-described problems, in the following embodiments, a glass optical fiber is passed through an inert gas immediately after the resin is applied on the glass optical fiber. Accordingly, since an accompanying flow composed of an inert gas will be formed in the vicinity of the surface of the resin, the resin will be able to be cured sufficiently.

Embodiments of the method of manufacturing an optical fiber according to the present invention will be described in detail below with reference to the drawings. It is to be noted that the present invention is not to be limited by these embodiments.

Figure 1:
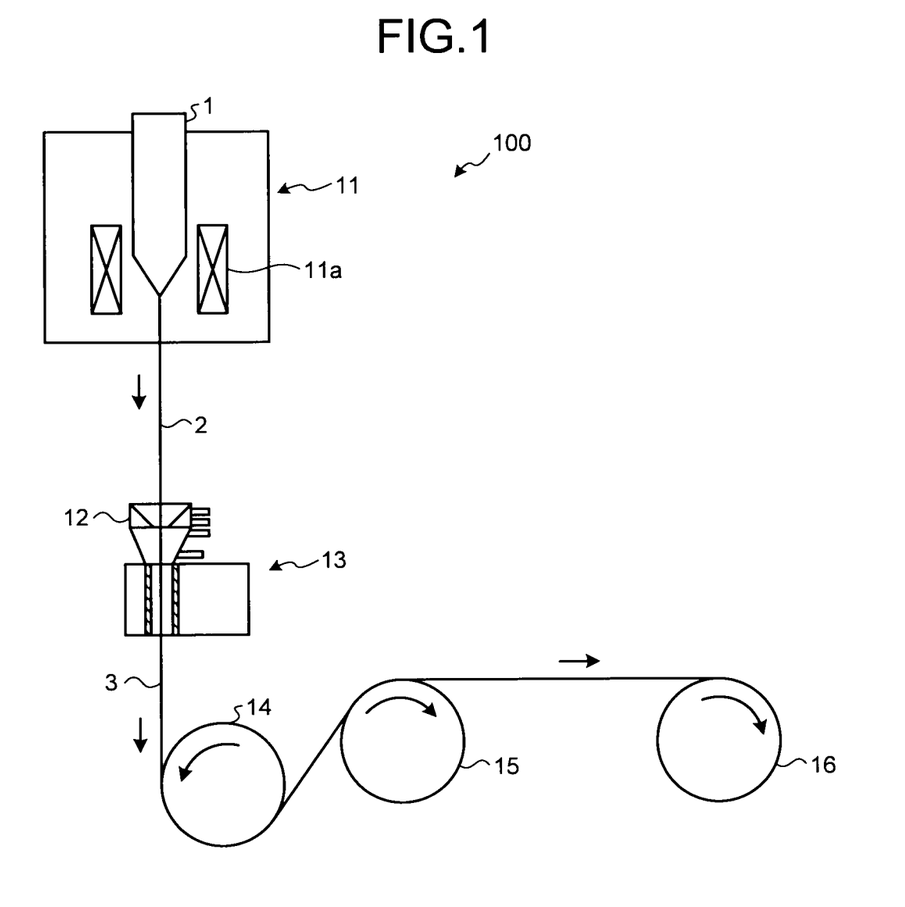
FIG. 1 is a schematic diagram showing an overall configuration of a manufacturing apparatus of an optical fiber used for embodying a method of manufacturing an optical fiber according to a first embodiment.

FIG. 1 is a schematic diagram showing an overall configuration of a manufacturing apparatus of an optical fiber used for embodying a method of manufacturing the optical fiber according to a first embodiment of the present invention. As shown in FIG. 1, a manufacturing apparatus 100 includes a wire drawing furnace 11, a resin-applying die 12, a coating forming apparatus 13, guide rollers 14 and 15, and a winding drum 16. The wire drawing furnace 11 has a heater 11a to melt one end of an optical fiber preform 1 mainly composed of quartz glass by heating. The resin-applying die 12 is a resin-applying apparatus and is arranged on a passage of a glass optical fiber 2 drawn from one end of the optical fiber preform 1 below the wire drawing furnace 11, a coating forming apparatus 13. The guide rollers 14 and 15 and the winding drum 16 are arranged below the coating forming apparatus 13.

Figure 2:
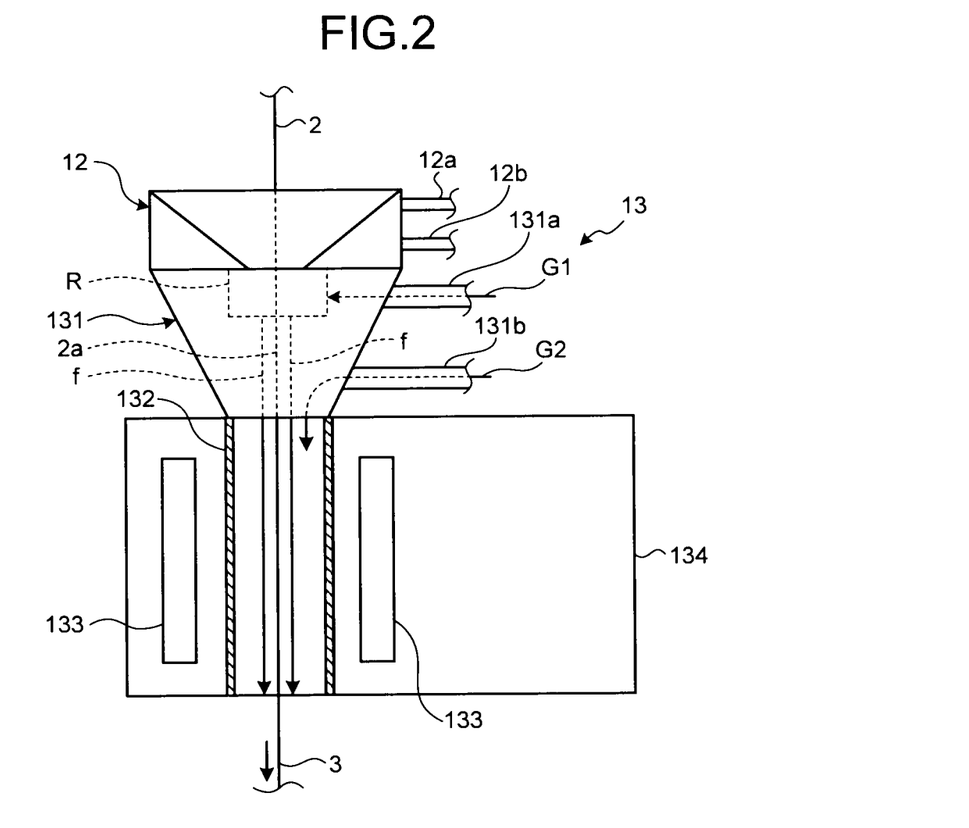
FIG. 2 is a schematic diagram showing a resin-applying die and a coating apparatus shown in FIG. 1.

FIG. 2 is a schematic diagram of the resin-applying die 12 and the coating forming apparatus 13 shown in FIG. 1. As shown in FIG. 2, the resin-applying die 12 includes resin supply tubes 12a and 12b. The resin supply tubes 12a and 12b supply two kinds of liquid resin to be applied to the glass optical fiber 2. The coating forming apparatus 13 includes a protecting tube 131, a transparent tube 132, an ultraviolet source 133, and a cabinet 134. The protecting tube 131 is arranged as being connected to the resin-applying die 12. The transparent tube 132 is a UV transmission tube and is arranged as being connected to the protecting tube 131. The ultraviolet source 133 is arranged on the outer circumference of the transparent tube 132. The cabinet 134 houses and holes the transparent tube 132 and the ultraviolet source 133

The protecting tube 131 is formed in a funnel shape and its material is, for example, glass, metal, plastics, or the like, but is not specifically limited. Space between the protecting tube 131 and the resin-applying die 12 and that between the protecting tube 131 and the transparent tube 132 are hermetically sealed so that the air should not enter. The protecting tube 131 includes an inert gas supply tube 131a that supplies an inert gas G1 into the protecting tube 131 and an oxygen containing gas supply tube 131b that supplies a gas containing oxygen (oxygen containing gas) G2 into the transparent tube 132 through the protecting tube 131. The inert gas supply tube 131a is provided on the side of the resin-applying die 12. The oxygen containing gas supply tube 131b is provided between the inert gas supply tube 131a and the transparent tube 132. The inert gas supply tube 131a and the oxygen containing gas supply tube 131b are each connected to gas supply sources (not shown) that supply respective gases G1, G2 via respective flow controllers (not shown). The quantity supplied and flow rate of the inert gas G1 and the oxygen containing gas G2 are controlled by these flow controllers. The flow controller is, for example, a mass flow controller, but may also be a control valve. The inert gas G1 is, for example, a nitrogen gas. The oxygen containing gas G2 is, for example, the air.

The transparent tube 132 is, for example, a quartz glass tube, but is not specifically limited as long as ultraviolet ray for curing a curing resin can be transmitted therethrough. The ultraviolet source 133 is, for example, a UV lamp, but is not specifically limited as long as ultraviolet ray that can cure a UV cured resin can be emitted therefrom. It is preferable that the cabinet 134 has a material and a structure that do not allow ultraviolet ray to leak.

Next, a method of manufacturing an optical fiber according to the first embodiment using the manufacturing apparatus 100 will be described. First, the optical fiber preform 1 is set to the wire drawing furnace 11. Next, one end of the optical fiber preform 1 is heat-melted by the heater 11a included in the wire drawing furnace 11, and the glass optical fiber 2 is drawn from the melted one end. The drawn glass optical fiber 2 runs downward to pass through the resin-applying die 12. In the resin-applying die 12, two kinds of liquid resin supplied from each of the resin supply tubes 12a and 12b are gathered. The resin is applied in two layers to the outer circumference of the glass optical fiber 2 that runs and passes the resin-applying die 12. A glass optical fiber 2a having the two-layered resin applied thereto enters the coating forming apparatus 13 immediately after the application of the resin.

In the coating forming apparatus 13, the glass optical fiber 2a first passes through the protecting tube 131. In the protecting tube 131, a region R through which the glass optical fiber 2a passes immediately after the resin being applied is in an inert gas atmosphere with the inert gas G1 supplied from the inert gas supply tube 131a. By letting the glass optical fiber 2a pass through the region R of the inert gas atmosphere, an accompanying flow f composed of the inert gas G1 will be formed near the surface around the resin.

Next, the glass optical fiber 2a passes through the transparent tube 132. To prevent fogging in the transparent tube 132, the oxygen containing gas G2 is supplied into the transparent tube 132 from the oxygen containing gas supply tube 131b. As a result, the transparent tube 132 is in an atmosphere of the oxygen containing gas G2. The glass optical fiber 2a as being accompanied by the accompanying flow f composed of the inert gas G1 enters the transparent tube 132 in oxygen containing gas atmosphere. The accompanying flow f cannot be easily be stripped off from the glass optical fiber 2a. Therefore, even if the transparent tube 132 is in the oxygen containing gas atmosphere, the resin of the glass optical fiber 2a will be protected by the accompanying flow f and prevented from coming into contact with oxygen. Then the ultraviolet source 133 emits the ultraviolet ray to the two-layered resin of the glass optical fiber 2a passing through the transparent tube 132, the two-layered resin being coated with the accompanying flow f, whereby the resin is cured. As a result, a two-layer coating is formed on the surface of the glass optical fiber 2a. At this point, the inner surface of the transparent tube 132 is prevented from being fogged by the oxygen containing gas atmosphere, and thus, it is possible to let sufficient amount of ultraviolet ray reach reaching the resin. Furthermore, because the resin is prevented from reacting with oxygen, the resin can be cured sufficiently with a sufficient amount of ultraviolet ray. Thereby, an optical fiber 3 having a fine coating whose resin is sufficiently cured can be manufactured.

Next, the guide rollers 14 and 15 guide the optical fiber 3 with the coating being formed. Finally, the winding drum 16 winds the optical fiber 3 having been guided by the guide rollers 14 and 15. The running speed (drawing speed) of the glass optical fibers 2, 2a and the optical fiber 3 is controlled by adjusting the rotation frequency of the winding drum 16.

As described above, according to the method of manufacturing an optical fiber according to the first embodiment, the optical fiber 3 having a fine coating with the resin being sufficiently cured can be manufactured. Particularly, in the method of manufacturing an optical fiber according to the first embodiment, the accompanying flow formed by passing the glass optical fiber 2a through an inert gas atmosphere is actively used. Therefore, a fine coating can be formed without needing a complex apparatus configuration such as, for example, in a case where a two-layer flow is to be formed inside a transparent tube, or precise control of the flow rate and displacement of each gas.

Next, preferable inert gases, conditions for an oxygen containing gas, and conditions for the drawing speed of an optical fiber in the method of manufacturing an optical fiber according to the first embodiment of the present invention will be described.

Firstly, a rare gas such as a nitrogen gas, helium gas, argon gas, or the like, can be used as an inert gas without specific limitation. It is preferable that these inert gases are of higher purity, although some oxygen may be contained as impurities to the extent that curing of the resin will not be hindered. The allowable concentration of the contained oxygen may preferably be 2% or less. The flow rate of the supplied inert gas is, for example, in a range of about 1 to 50 SLM. The pressure of the inert gas atmosphere formed inside the protecting tube 131, for example, is preferably equal to or greater than that of the oxygen containing gas atmosphere formed inside the transparent tube 132.

If the flow rate of the supplied inert gas is smaller than 1 SLM, the region R cannot be made to be in a complete inert gas atmosphere. In this case, the accompanying flow f composed of the inert gas G1 may not be able to be formed near the surface around the resin. Moreover, when the flow rate of the supplied inert gas is greater than 50 SLM, there may be a possibility that the running optical fiber may shake or break. If the pressure of an inert gas atmosphere is equal to or less than the pressure of an oxygen containing gas atmosphere, there may be a possibility that the inert gas atmosphere may break by having an oxygen containing gas mixed therein. Accordingly, here may be a possibility that the region R of the inert gas atmosphere may not be formed.

As an oxygen containing gas, any gas with a concentration of oxygen capable of removing the fogging on the inner surface of the transparent tube 132 may be used. A preferable concentration of oxygen is 5% or greater. The air or an oxygen gas can be used as the oxygen containing gas. A preferable flow rate of the supplied oxygen containing gas is, for example, in a range of about 1 to 50 SLM. The pressure of an oxygen containing gas atmosphere formed inside the transparent tube 132 is preferably equal to or less than the pressure of an inert gas atmosphere in the region R, for example.

Especially, when a Reynolds number which is a dimensionless number showing an appearance of flow inside a tube is less than 2400, the accompanying flow f inside the transparent tube 132 becomes a laminar flow. Therefore, the two-layer flow constructed from a layer of the accompanying flow composed of the inert gas and a layer of the gas containing oxygen may be able to be easily formed. As a result, the optical fiber 3 having a fine coating with a resin being sufficiently cured can be obtained more reliably. Therefore, it is preferable that a flow rate of the inert gas G1 and the oxygen containing gas G2 and an inside diameter of the transparent tube 132 is set so that a Reynolds number becomes less than 2400.

Next, conditions for the drawing speed of a glass optical fiber will be described. When the drawing speed of a glass optical fiber is fast, an accompanying flow that is thicker and difficult to be striped off can be formed around a resin by letting the glass optical fiber having the resin applied thereto run in an inert gas atmosphere. Accordingly, fast drawing speed is preferable.

Figure 3:
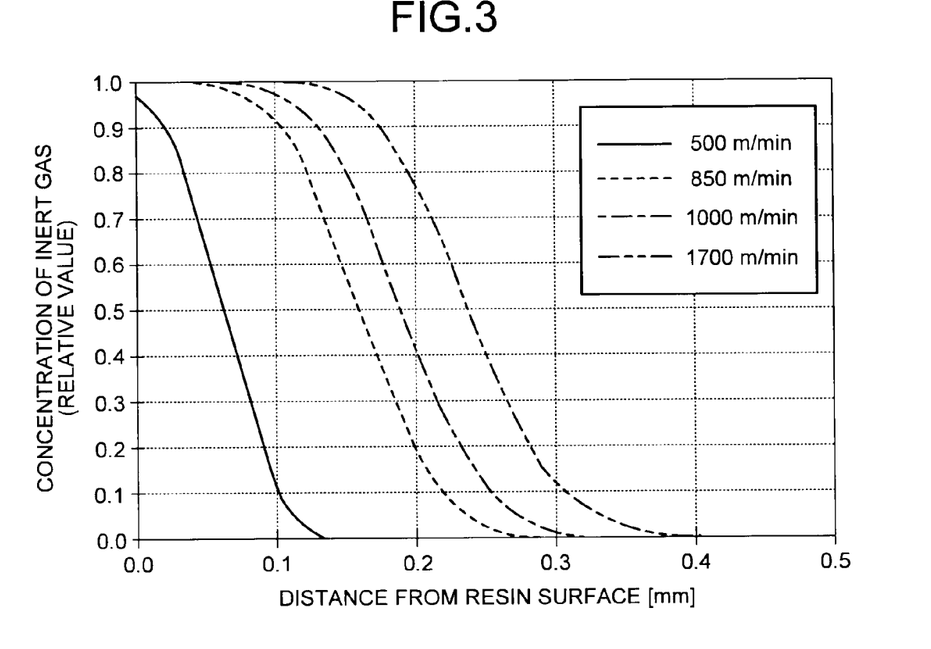
FIG. 3 is a diagram showing a relationship between a distance between the applied resin and the surface of the glass optical fiber and the concentration of inert gas after letting the glass optical fiber with the resin being applied run under inert gas atmosphere at a predetermined drawing speed.

FIG. 3 is a diagram showing a relationship between the distance between a position and a surface of a resin applied to glass after letting a glass optical fiber with the resin being applied to run at a predetermined drawing speed in an atmosphere of an inert gas and the concentration of the inert gas at the position. FIG. 3 was obtained by a flow analysis on an accompanying flow near the entrance of the transparent tube 132 in FIG. 2. The analysis was done under the conditions that the flow rate of the supplying inert gas was 40 SLM and the flow rate of the supplying oxygen containing gas was 35 SLM. Here, it is appropriate as long as the inside diameter of the transparent tube is sufficiently larger than the outside diameter of the glass optical fiber, which can be equal to or greater than 5 mm in diameter, for example. Accordingly, the inside diameter was set to 5 mm for the analysis. A nitrogen gas was used as the inert gas. The vertical axis represents the concentration of the inert gas as a relative value. Accordingly, "0.0" means that no inert gas was present in the atmosphere at the position and "1.0" means that 100% of the atmosphere at the position was an inert gas.

As shown in FIG. 3, as the drawing speed of the glass optical fiber increased from 500 m/min to 1700 m/min, the thickness of the inert gas formed therearound increased. This indicates that an accompanying flow was formed with increasing thickness as the drawing speed increased from 500 m/min to 1700 m/min. Particularly when the drawing speed was 850 m/min or greater, a sufficiently developed accompanying flow was formed. It can be considered that an accompanying flow being developed in such a way will not be striped off that easily against a spray of an oxygen containing gas. Accordingly, it is preferable to set the drawing speed of the glass optical fiber to 850 m/min or greater.

Figure 4:
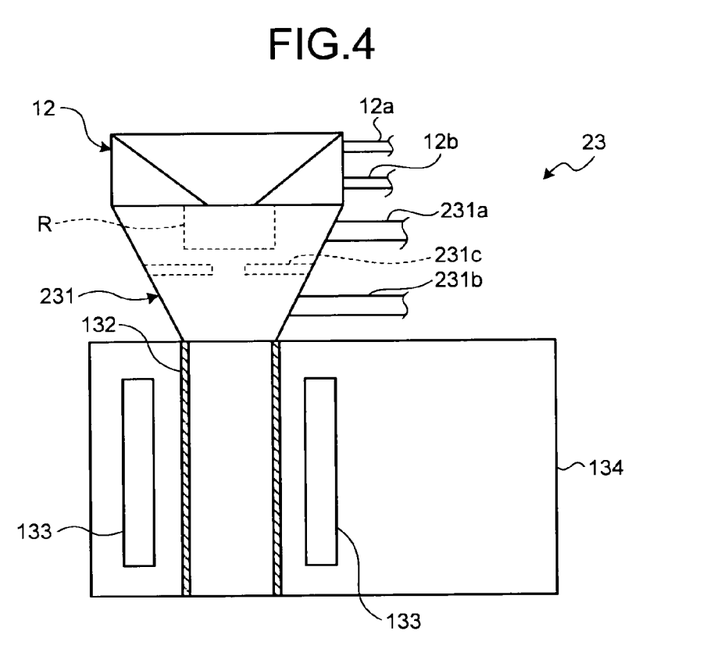
FIG. 4 is a schematic diagram showing the resin-applying die and a coating apparatus according to a second embodiment.

Next, coating forming apparatuses that can be used for the method of manufacturing the optical fiber according to the first embodiment will be described as second to fourth embodiments of the present invention. FIG. 4 is a schematic diagram showing the resin-applying die and the coating forming apparatus according to the second embodiment.

In FIG. 4, the resin-applying die 12 is the same as that shown in FIG. 1 and includes the resin supply tubes 12a and 12b to supply two kinds of liquid resin. The coating forming apparatus 23 of the second embodiment has the transparent tube 132, the ultraviolet source 133, and the cabinet 134 which are similar to those in the coating forming apparatus 13 shown in FIG. 1. In the coating forming apparatus 23, however, the protecting tube 131 in the coating forming apparatus 13 is replaced by a protecting tube 231.

The protecting tube 231 is formed in a funnel shape like the protecting tube 131. Borders between the protecting tube 231 and the resin-applying die 12 and between the protecting tube 231 and the transparent tube 132 are hermetically sealed so that the air should not enter. The protecting tube 231 includes an inert gas supply tube 231a and an oxygen containing gas supply tube 231b connected to gas supply sources (not shown) via respective flow controllers. Furthermore, the protecting tube 231 includes a baffle board 231c provided on the inner circumference at a position between the inert gas supply tube 231a and the oxygen containing gas supply tube 231b. The baffle board 231c, for example, in a disc shape having an insertion hole in the center portion for letting the glass optical fiber pass through.

In the coating forming apparatus 23, the inner pressure in the region R of an inert gas atmosphere through which a glass optical fiber passes immediately after having a resin applied thereto in the protecting tube 231 rises due to the presence of the baffle board 231c. Therefore, an oxygen containing gas or the air is less likely to mix in the region R. As a result, an accompanying flow composed of the inert gas will formed as thicker in the vicinity of the surface around the resin even more reliably, whereby the resin can be cured even more reliably.

Figure 5:
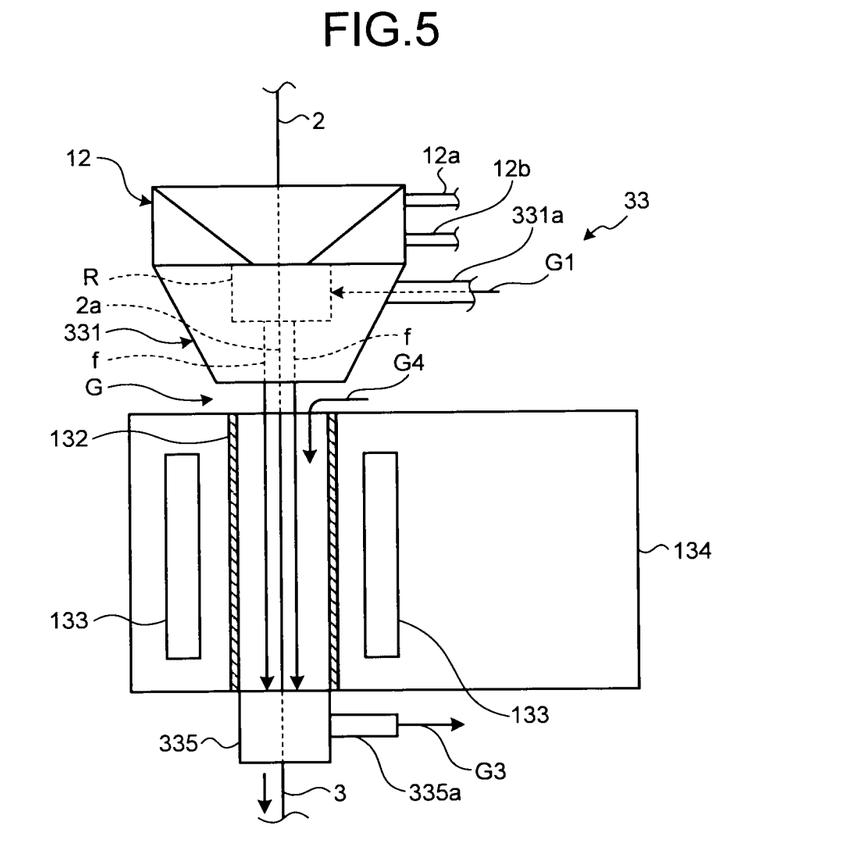
FIG. 5 is a schematic diagram showing the resin-applying die and a coating apparatus according to a third embodiment.

Next, a coating forming apparatus according to the third embodiment of the present invention will be described. FIG. 5 is a schematic diagram showing the resin-applying die and the coating forming apparatus according to the third embodiment.

In FIG. 5, the resin-applying die 12 is the same as that shown in FIG. 1 and includes the resin supply tubes 12a and 12b. The coating forming apparatus 33 of the third embodiment has the transparent tube 132, the ultraviolet source 133, and the cabinet 134 which are similar to those in the coating forming apparatus 13 shown in FIG. 1. In the coating forming apparatus 33, however, the protecting tube 131 in the coating forming apparatus 13 is replaced by a protecting tube 331.

The protecting tube 331 is formed in a funnel shape like the protecting tube 131. The protecting tube 331 is provided on the side of the resin-applying die 12 and includes an inert gas supply tube 331a connected to a gas supply source (not shown) via a flow controller (not shown). A border between the protecting tube 331 and the resin-applying die 12 is hermetically sealed so that the air should not enter. In contrast, a gap G is formed between the protecting tube 331 and the transparent tube 132. Furthermore, the lower end of the transparent tube 132 is sealed by a sealing member 335 provided with an exhaust pipe 335a. The exhaust pipe 335a is connected to a vacuum pump (not shown) via a regulating valve (not shown).

When the coating forming apparatus 33 is used, the glass optical fiber 2a to which a resin is applied by the resin-applying die 12 first passes through the protecting tube 331. In the protecting tube 331, the region R through which the glass optical fiber 2a passes immediately after the resin is applied is in an inert gas atmosphere with the inert gas G1 supplied from the inert gas supply tube 331a. By letting the glass optical fiber 2a pass through the region R, the accompanying flow f composed of the inert gas G1 will be formed near the surface around the resin.

On the other hand, an air G4 containing oxygen is sucked in through the gap G by letting the pressure inside the transparent tube 132 become negative by exhausting a gas G3 inside the transparent tube 132 through the exhaust pipe 335a using the vacuum pump while regulating the flow rate by the regulating valve. As a result, the transparent tube 132 will be in an atmosphere of the air G4. The amount of the air G4 sucked into the transparent tube 132 through the gap G or the inner pressure of the transparent tube 132 is determined by the width of the gap G and the displacement of the gas G3 from the exhaust pipe 335a.

In this case, also it is preferable that a flow rate of the inert gas, an inside diameter of the transparent tube 132, a width of the gap G and the displacement of the gas G3 are set so that a Reynolds number becomes less than 2400.

Then, the glass optical fiber 2a accompanied by the accompanying flow f composed of the inert gas G1 enters the transparent tube 132 having being arranged in such condition. The resin of the glass optical fiber 2a is prevented from contacting the oxygen due to the accompanying flow f, while the inner surface of the transparent tube 132 is prevented from being fogged by the atmosphere of the air G4. Therefore, the amount of ultraviolet ray reaching the resin will become sufficient. As a result, the optical fiber 3 having a fine coating with a resin being sufficiently cured can be manufactured.

Figure 6:
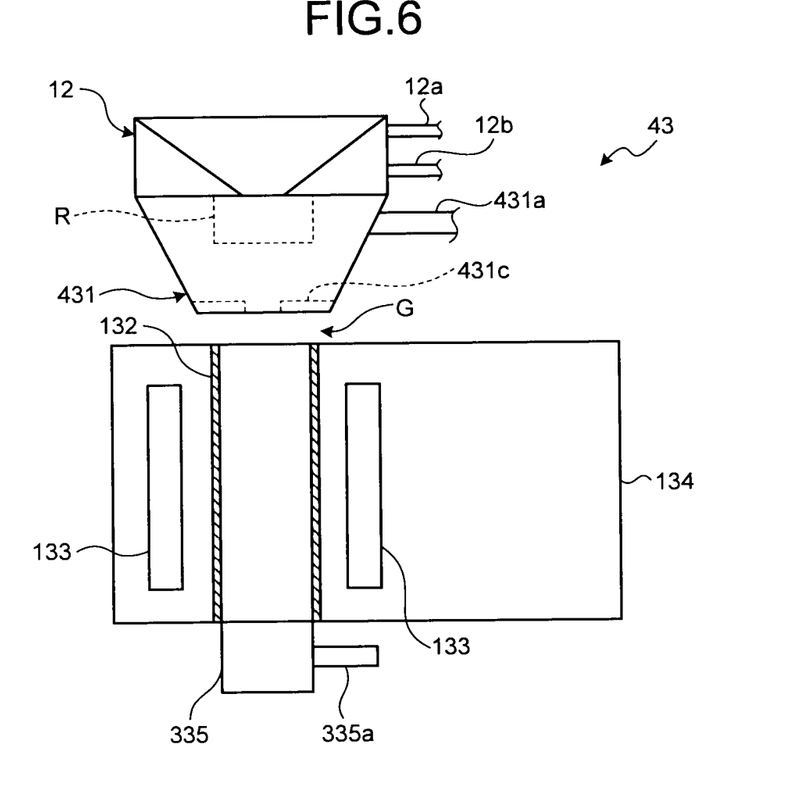
FIG. 6 is a schematic diagram showing the resin-applying die and a coating apparatus according to a fourth embodiment.

Next, a coating forming apparatus according to the forth embodiment of the present invention will be described. FIG. 6 is a schematic diagram showing a resin-applying die and a coating forming apparatus according to the fourth embodiment.

In FIG. 6, the resin-applying die 12 is the same as that shown in FIG. 5 and includes the resin supply tubes 12a and 12b. The coating forming apparatus 43 of the fourth embodiment has the transparent tube 132, the ultraviolet source 133, and the cabinet 134 which are similar to those in the coating forming apparatus 33 shown in FIG. 5. In the coating forming apparatus 43, however, the protecting tube 331 in the coating forming apparatus 33 is replaced by a protecting tube 431.

The protecting tube 431 is formed in a funnel shape like the protecting tube 331 and includes an inert gas supply tube 431a. A border between the protecting tube 431 and the resin-applying die 12 is hermetically sealed so that the air should not enter. On the other hand, a gap G is formed between the protecting tube 431 and the transparent tube 132. Furthermore, the protecting tube 431 includes a baffle board 431c provided on the inner circumference at a position of the lower end thereof. The baffle board 431c, for example, is in a disc shape having an insertion hole in the center portion for letting the glass optical fiber pass through. Moreover, the lower end of the transparent tube 132 is sealed by the sealing member 335 provided with the exhaust pipe 335a. The exhaust pipe 335a is connected to a vacuum pump (not shown) via a regulating valve (not shown).

In the coating forming apparatus 43, the inner pressure in the region R of an inert gas atmosphere through which a glass optical fiber passes immediately after having a resin applied thereto in the protecting tube 431 rises due to the presence of the baffle board 431c. Therefore, an oxygen containing gas or the air is less likely to mix in the region R. As a result, an accompanying flow composed of the inert gas will be formed as thicker in the vicinity of the surface around the resin even more reliably, whereby the resin can be cured even more reliably.

Next, using a coating forming apparatus having the structure according to the fourth embodiment shown in FIG. 6 as a manufacturing apparatus of optical fiber, optical fibers were produced while setting various values for the drawing speed of glass optical fibers. A nitrogen gas of 99.9% purity was used as an inert gas. The flow rate of the nitrogen gas supplied to the protecting tube was set to 35 SLM. The width of a gap between the protecting tube and transparent tube was set to 40 mm and the exhaust pressure in an exhaust pipe was controlled to be at 0.08 kPa.

Figure 7:
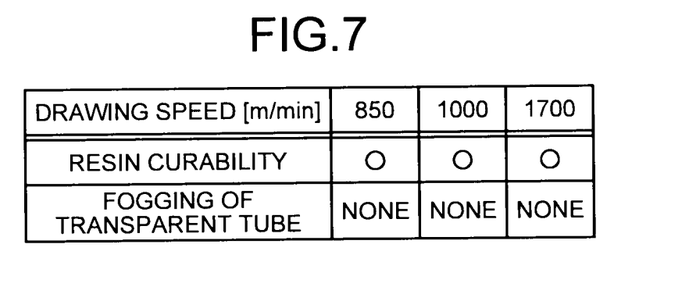
FIG. 7 is a diagram showing resin curability and a fogging condition of a transparent tube when optical fibers are produced using the coating apparatus having a structure according to the fourth embodiment.

FIG. 7 is a diagram showing resin curability and the fogging condition of a transparent tube when optical fibers are produced using the coating forming apparatus having a structure according to the fourth embodiment. Regarding the resin curability, a case where a coated optical fiber is wound by a winding drum without being broken is judged as "○" and a case where a coated optical fiber was broken at a guide roller or winding drum was judged as "X". The fogging condition of the transparent tube was judged by visual inspection.

As shown in FIG. 7, the transparent tube was not fogged when the drawing speed of the glass optical fiber was 850, 1000, or 1700 m/min. Regarding the resin curability, the glass optical fiber did not break at the guide roller or the winding drum and the coating of the produced optical fiber was sufficiently cured.

The present example shows a case in that the drawing speed of the glass optical fiber is 850 m/min or greater. However, even if the drawing speed of the glass optical fiber was slower than 850 m/min and was about 500 m/min or so, for example, an accompanying flow composed of the nitrogen gas can be formed near the surface around the resin of the glass optical fiber by exercising control such as increasing the flow rate of the nitrogen gas supplied to the protecting tube in accordance with the drawing speed. As a result, the effect of the present invention can be achieved.

Especially, when a Reynolds number which is a dimensionless number showing a flow behavior appearance of flow inside a tube is less than 2400, the flow inside the transparent tube becomes a laminar flow. Accordingly, and the two-layer flow constructed from a layer of accompanying flow composed of the inert gas and a layer of the gas containing oxygen can be formed easily. As a result, the optical fiber 3 having a fine coating which a resin being sufficiently cured can be manufactured. Therefore, it is preferable that a flow rate of each of the gasses, an inside diameter of the transparent tube 132, a width of the gap G and the displacement of the gas G3 are set so that a Reynolds number becomes less than 2400. Settings of such conditions can be adjusted according to the a drawing speed of the glass optical fiber.

According to the above-described embodiments of the present invention, a reaction between resin and oxygen is prevented by forming an accompanying flow composed of an inert gas near the surface of the resin of the glass optical fiber immediately after having the resin applied while a gas containing oxygen is supplied to a UV transmission tube to prevent fogging on the inner surface of the tube. As a result, a fine coating with a resin being sufficiently cured can be formed.

The coating forming apparatuses according to the third and fourth embodiments include an aspiration mechanism such as an exhaust pipe and absorb the air by making the pressure inside the transparent tube negative. However, if the drawing speed of the glass optical fiber is sufficiently fast, arrangement of the aspiration mechanism such as the exhaust pipe may not be necessary because some amount of air will be dragged into the transparent tube by the running of the glass optical fiber.

The coating forming apparatuses according to the third and fourth embodiments are provided with a gap between the protecting tube and the transparent tube as an air introducing unit. However, such arrangement of a gap is not particularly necessary. In that case, it is preferable that the protecting tube should have an air introducing hole formed in a lower part of the inert gas supply unit while the border between the protecting tube and the transparent tube is hermetically sealed.

The resin-applying die in each of the above embodiments is configured to be able to apply a two-layered resin. In a case of forming a two-layer coating using a resin-applying die capable of applying only a one-layer resin, for example, two sets of a combination of the resin-applying die and coating forming apparatus shown in FIG. 2 may be arranged in series on the passage of the glass optical fiber. In this case, when the optical fiber passes through each combination, the application of the resin and the formation of the coating are processed in that order.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber, comprising:
    applying a UV curable resin via a resin-applying apparatus to an outer circumference of a running glass optical fiber;
    supplying an inert gas via an inert gas supply unit into a protecting tube directly connected to the resin-applying apparatus and forming an accompanying flow composed of the inert gas near a surface of the resin by passing the glass optical fiber, immediately after having the resin being applied, through an atmosphere of the inert gas in the protecting tube; and
    forming a coating by irradiating the resin covered with the accompanying flow with an ultraviolet ray to cure the resin while the glass optical fiber accompanied by the accompanying flow is passed through a UV transmission tube to which a gas containing oxygen is supplied,
    wherein the inert gas and the gas containing oxygen form a two-layer flow,
    wherein the gas containing oxygen is supplied to the UV transmission tube by an oxygen containing gas supply unit arranged between the inert gas supply unit and the UV transmission tube, and
    wherein the ultraviolet ray is emitted from an ultraviolet source arranged on the outer circumference of the UV transmission tube, the UV transmission tube connected to the protecting tube.

2. The method according to claim 1, wherein a drawing speed of the glass optical fiber is set to 850 m/min or greater.

3. The method according to claim 1, wherein a flow rate of the supplied inert gas is in a range of about 1 to 50 SLM.

4. The method according to claim 1, wherein a pressure of the inert gas atmosphere formed inside the protecting tube is preferably equal to or greater than a pressure of an atmosphere of the gas containing oxygen formed inside the UV transmission tube.

5. The method according to claim 1, further comprising hermetically sealing the resin-applying apparatus to the protecting tube.

6. A method of manufacturing an optical fiber, comprising:
    applying a UV curable resin via a resin-applying apparatus to an outer circumference of a running glass optical fiber;
    supplying an inert gas via an inert gas supply unit into a protecting tube directly connected to the resin-applying apparatus and forming an accompanying flow composed of the inert gas near a surface of the resin by passing the glass optical fiber, immediately after having the resin being applied, through an atmosphere of the inert gas in the protecting tube; and
    forming a coating by irradiating the resin covered with the accompanying flow with an ultraviolet ray to cure the resin while the glass optical fiber accompanied by the accompanying flow is passed through a UV transmission tube to which a gas containing oxygen is supplied,
    wherein the inert gas and the gas containing oxygen form a two-layer flow, wherein the gas containing oxygen is supplied to the UV transmission tube from an air introducing unit for introducing air from outside, the air introducing unit being arranged between the inert gas supply unit and the UV transmission tube, and wherein the ultraviolet ray is emitted from an ultraviolet source arranged on the outer circumference of the UV transmission tube.

7. The method according to claim 6, wherein a drawing speed of the glass optical fiber is set to 850 m/min or greater.

8. The method according to claim 6, wherein a flow rate of the supplied inert gas is in a range of about 1 to 50 SLM.

9. The method according to claim 6, wherein a pressure of the inert gas atmosphere formed inside the protecting tube is preferably equal to or greater than a pressure of an atmosphere of the gas containing oxygen formed inside the UV transmission tube.

10. The method according to claim 6, further comprising hermetically sealing the resin-applying apparatus to the protecting tube.

* * * * *